United States Patent [19]

Turner et al.

[11] Patent Number: 4,853,054

[45] Date of Patent: Aug. 1, 1989

[54] PROCESS FOR PREPARING POLYURETHANE CARPET BACKINGS BASED ON HIGH EQUIVALENT WEIGHT POLYOLS

[75] Inventors: Robert B. Turner, Lake Jackson, Tex.; Randall C. Jenkines, Resaca, Ga.; John F. Serratelli, Lake Jackson, Tex.; Garland R. Barnes, Rocky Face, Ga.

[73] Assignee: The Dow Chemical Company, Midland, Mich.

[21] Appl. No.: 102,220

[22] Filed: Sep. 29, 1987

[51] Int. Cl.$^4$ .......................... B32B 31/14; B32B 5/18
[52] U.S. Cl. .......................... 156/78; 428/95; 428/96; 428/97; 428/316.6; 428/423.1; 521/88
[58] Field of Search .................. 156/78, 79; 428/95, 428/96, 97, 316.6, 423.1; 521/88

[56] References Cited

U.S. PATENT DOCUMENTS

| | | | |
|---|---|---|---|
| 4,296,159 | 10/1981 | Jenkines et al. | 428/95 |
| 4,483,894 | 11/1984 | Porter et al. | 428/95 |
| 4,696,849 | 9/1987 | Mobley et al. | 428/95 |

*Primary Examiner*—Robert A. Dawson

[57] ABSTRACT

Polyurethane-backed textiles are prepared from a polyurethane-forming composition employing a polyether polyol having an equivalent weight of at least about 1000, a specified functionality and an internal poly(ethylene oxide) block or a terminal ethylene oxide end cap of at least about 15% by weight. The use of these polyether polyols provides a particularly desirable combination of processing and physical characteristics.

10 Claims, No Drawings

PROCESS FOR PREPARING POLYURETHANE CARPET BACKINGS BASED ON HIGH EQUIVALENT WEIGHT POLYOLS

BACKGROUND OF THE INVENTION

This invention relates to polyurethane-backed textiles, and particularly to textiles which are backed with a polyurethane foam.

Various textiles, most notably carpet, often have an attached polyurethane foam backing for cushioning and other purposes. These polyurethane-backed textiles are usually prepared by applying to one surface of the textile a mixture of polyisocyanate and at least one high equivalent weight polyol, which subsequently reacts to form a cellular backing adherent to the textile.

Preparing the backed textiles in this manner has met with formidable processing difficulties. As all of the reactive components of the polyurethane-forming composition are mixed prior to application to the textile, the initial reactivity must be delayed so that the composition does not gel before it is applied and gauged. The characteristics of the composition must also be such that it can easily be blown or frothed to a desirable density. Once the composition is blown or frothed and applied to the carpet, it must react quickly and completely in order to form a tack-free backing in as short a cure time as possible. In addition, the resulting polyurethane backing must have good physical properties, particularly good tensile, elongation and tear properties, low residual tack and high dimensional stability. Often, modifications in a polyurethane-forming composition which improve one of these processing characteristics of physical properties make others worse. Thus, it has been very difficult to provide a polyurethane-forming composition which has all of the desired attributes in processing and physical properties.

Accordingly, it would be desirable to provide a process for preparing polyurethane-backed textiles, wherein a polyurethane-forming composition is employed which is improved processing characteristics and/or physical properties.

SUMMARY OF THE INVENTION

In one aspect, this invention is an improvement in a process for preparing a polyurethane-backed textile wherein an uncured polyurethane-forming composition is applied to a surface of the textile, gauged and cured to form an adherent backing thereto, the improvement comprising employing a polyurethane-forming composition comprising (A) a polyol based on a $C_3$–$C_8$ alkylene oxide, which polyol has an equivalent weight of about 1000 to about 5000, and an internal poly(ethylene oxide) block or terminal ethylene oxide cap constituting about 15 to about 30 percent of the weight of the polyol, or mixture of such polyols, wherein said polyol or mixture thereof has an average functionality of about 1.8 to about 2.2, (B) a minor amount of a low equivalent weight compound having about 2 active hydrogen containing groups per molecule, and (C) a polyisocyanate having an average functionality of about 1.9 to about 2.4, in an amount to provide the composition with about 0.9 to about 1.3 isocyanate groups per active hydrogen containing group, and (D) an effective amount of a blowing agent.

In another aspect, this invention is a process for preparing a polyurethane-backed textile, comprising the steps of (A) applying to a surface of a textile a layer of a polyurethane-forming composition according to this invention, and (B) curing said polyurethane-forming composition to form a cellular polyurethane backing adherent to said textile.

In still another aspect, this invention is an active hydrogen-containing composition comprising (A) a polyol based on a $C_3$–$C_8$ alkylene oxide, which polyol has an equivalent weight of about 1000 to about 5000 and an internal poly(ethylene oxide block) or a terminal ethylene oxide cap constituting about 15 to about 30 percent of the weight of the polyol, or mixture of such polyols, wherein said polyol or mixture thereof has an average functionality of about 1.8 to about 2.2, (B) a minor amount of a low equivalent weight compound having about 2 active hydrogen containing groups per molecule, and (C) about 5 to about 500 parts, per 100 parts of component (A), of an inorganic, particulate filler.

In preparing polyurethane-backed carpet according to this invention, excellent processability and excellent physical properties of the resultant backed carpet are achieved.

DETAILED DESCRIPTION OF THE INVENTION

In this invention, a polyurethane-forming composition comprising a certain high equivalent weight polyol, a chain extender and a polyisocyanate is used to provide a cellular textile backing.

The polyurethane-forming composition contains, as one component, a polyol based on a $C_3$–$C_8$ alkylene oxide. By "based on a $C_3$–$C_8$ alkylene oxide", it is meant that the polyol, exclusive of end-capping, is a polymer of a monomer or monomer mixture which is predominantly a $C_3$–$C_8$ alkylene oxide, although a minor amount of the monomer mixture, preferably not to exceed about 30, preferably not to exceed 20 weight percent thereof, may be another copolymerizable monomer, preferably ethylene oxide. This polyol has an equivalent weight of about 1000 to about 5000, preferably about 1800 to about 3000, and more preferably about 1900 to about 2500. The use of higher equivalent weight materials has been found to provide improved properties, notably improved tensile, elongation and tear properties.

The polyol also has an internal poly(ethylene oxide) block or a terminal ethylene oxide cap constituting about 15 to about 30, preferably about 16.5 to about 30, more preferably about 17–25, most preferably about 17–20 percent of the weight of the polyol. It has been found that when polyols having equivalent weights of 1800 or higher are used, they are difficult to foam, especially in a frothing process, unless it contains an internal poly(ethylene oxide) block or terminal ethylene oxide cap constituting about 15 weight percent or more of the polyol. However, if the ethylene oxide cap exceeds about 30 weight percent, the polyol tends to be too hydrophilic to be suitable.

In addition, the polyol or, if a mixture of more than one such polyols are used, the mixture of polyols has an average functionality of about 1.8 to about 2.2, preferably about 1.9 to about 2.1, more preferably about 1.95 to about 2.05, most preferably about 1.98 to about 2.02.

Preferably, the polyol comprises a polymer of propylene oxide which is end-capped with about 17 to about 20 weight percent ethylene oxide. Copolymer polyols which use such polyethers as the base polyol are also suitable. More preferably, the polyol is a mixture of a nominally trifunctional ethylene oxide capped poly(propylene oxide) and a nominally difunctional ethylene oxide-capped poly(propylene oxide), in proportions such that the average functionality is within the recited ranges. Commercially available materials of this type have actual functionalities which are lower than the nominal functionalities, due to the formation of monofunctional species during their manufacture. Accordingly, mixtures containing about 30–70, preferably about 40–60, weight percent of the nominal triol and 70–30, preferably about 60–40, weight percent of the nominal diol are preferred.

The polyurethane-forming composition also contains a chain extender, i.e., a low equivalent weight compound having about 2 active hydrogen containing groups per molecule. The active hydrogen-containing groups may be hydroxyl, mercaptan or amine, although if amine chain extenders are used, it is preferred that it be a stearically hindered, encapsulated or blocked amine as other amine chain extenders tend to be too reactive to be easily processed to make textile backings. Preferred chain extenders include the α,ω-alkylene glycols and glycol ethers such as ethylene glycol, 1,4-butane diol, 1,6-hexamethylene glycol, dipropylene glycol, tripropylene glycol, diethylene glycol, triethylene glycol, and the like; cyclohexanedimethanol; the diverse bisphenols, and the like. Suitable amine chain extenders include methylene bis(o-cloroaniline), NaCl-blocked methylene dianiline, diethyltoluenediamine and the like.

In making textile backings, a minor amount of chain extender is advantageously used. Preferably about 5 to about 25, more preferably about 5 to about 20 parts of the chain extender are used per 100 parts by weight of the polyol.

A polyisocyanate is used in the polyurethane-forming composition. The polyisocyanate used herein has an average functionality of about 1.9 to about 2.4. Lower functionalities tend to provide an undercured polyurethane, whereas higher functionalities tend to promote trimerization of the polyisocyanate, which leads to undesirable crosslinking. When no precoat layer is used, the polyisocyanate preferably has an average functionality of about 1.95 to about 2.2, more preferably about 1.95 to about 2.1, in order that the polyurethane-forming composition as a whole has an average functionality of as close to 2.00 as possible. When a precoat layer is used, the polyisocyanate can have a somewhat higher functionality, as the precoat layer causes the textile to be more resistant to distortion due to crosslinking in the foam layer. In such case, the polyisocyanate preferably has an average functionality of about 2.0 to about 2.3, more preferably about 2.03 to about 2.2, as the slightly higher functionality provides a lower tack polyurethane having better properties.

The polyisocyanate may be aromatic or aliphatic. Suitable aromatic polyisocyanates useful herein include phenyl diisocyanate, 2,4- and/or 2,6-toluene diisocyanate, ditoluene diisocyanate, naphthylene 1,4-diisocyanate, 2,4'- and/or 4,4'-diphenylmethanediisocyanate, polymethylene polyphenylenepolyisocyanates, and the like. Suitable aliphatic polyisocyanates include the hydrogenated derivatives of the foregoing aromatic polyisocyanates, 1,6 hexamethylene diisocyanate, isophorone diisocyanate, 1,4cyclohexyl diisocyanate, 1,4-bis-(isocyanatomethyl)cyclohexane or mixtures thereof, and the like.

In addition, polyisocyanates containing urethane, urea, biuret, carbodiimide, allophanate and similar groups are also useful. Of particular interest are so-called "liquid MDI" products, having an equivalent weight of about 130–150, and prepolymers prepared from a diisocyanate and a relatively low equivalent weight compounds having from about 2–4 hydroxyl groups per molecule.

Preferred are toluene diisocyanate (TDI) and diphenylmethanediisocyanate (MDI) and its derivatives, as well as prepolymers thereof. The most preferred TDI-based isocyanate is a prepolymer made by reacting as excess of TDI with glycerine, an adduct of glycerine and ethylene oxide or propylene oxide, trimethylolpropane, or mixtures thereof with a low equivalent weight polyoxyalkylene glycol such as diethylene glycol, tetraethylene glycol or higher polyethylene glycol so the resulting prepolymer has an average functionality of about 2.03 to about 2.2. The most preferred MDI-based polyisocyanates are prepolymers of pure MDI and mixtures of MDI with a polymeric MDI having an average functionality of about 2.03 to about 2.2.

The polyisocyanate is advantageously used in an amount sufficient to provide the polyurethane-forming composition with about 0.9 to about 1.3, preferably about 1.05 to about 1.25, more preferably about 1.05 to about 1.2 isocyanate groups per active hydrogen-containing group. At lower levels of polyisocyanate, inadequate curing is achieved. At higher levels of polyisocyanate, increase crosslinking is obtained, which adversely affects the properties of the backing. It is noted that the optimum amount of polyisocyanate varies somewhat with the prevailing weather conditions, particularly temperature and humidity, as well as with the moisture content of the textile substrate, as discussed in copending application Ser. No. 776,320, filed Sept. 16, 1985, now U.S. Pat. No. 4,696,849 incorporated herein by reference.

In order to produce a cellular backing, a blowing agent is used. In this invention, the term blowing agent refers to any material which provides a cellular structure of the polyurethane. Suitable blowing agents include gasses such as air, nitrogen, carbon dioxide, argon, helium and the like; water; low-boiling halogenated compounds such as the diverse chlorofluoromethanes and ethanes; the so-called azo blowing agents such as azobis(formamide), finely divided solids, and the like. In this invention, it is preferred to employ a gas as the blowing agent, which is incorporated into the polyurethane-forming composition by frothing. The use of water in conjunction with the gas is also preferred, as the resulting foam contains urea linkages which improve tensile, elongation and tear strength. In any case, a sufficient amount of the blowing agent is used to provide a polyurethane backing having a density of about 2 to about 55 pounds per cubic foot or more. For chemically blown backings, the density is preferably about 3 to about 30, more preferably about 3 to about 21 pounds per cubic foot. For frothed backings, the density is preferably about 10 to about 30, more preferably about 10 to about 18 pounds per cubic foot.

In addition to the aforementioned critical components, other optional ingredients may also be used. In particular, a catalyst for the reaction of the active hydrogen-containing materials with the polyisocyanate is preferably present, as is a surfactant which stabilizes the composition against cell collapse until cure is completed. It is also preferred to use an inorganic filler, in order to provide improved physical properties and reduce the raw material cost. This filler is preferably inert, i.e., does not react with the active hydrogen-containing components or the polyisocyanate.

Suitable catalysts include organometallic catalysts and/or tertiary amine compounds. Suitable organometallic compounds include compounds of tin, lead, iron, bismuth, mercury and the like. When a TDI-based polyisocyanate is used, the organotin and tertiary amine catalysts are preferred. Preferred organotin catalysts include stannic carboxylates such as tin octoate and tin oleate, and stannous compounds such as dimethyltindilaurate, dibutyltindilaurate, diethyltinediacetate, di(2-ethylhexyl) tin oxide, dialkyltinbis(alkylmercaptoesters) such as di(n-butyl)tinbis(isooctylmercaptoacetate), di(isooctyl)tin bis(isooctylmercaptoacetate) and the like. Preferred tertiary amine catalysts include trialkyl amines and heterocyclic amines, such as alkylmorpholines, 1,4-dimethylpiperazine, triethylene diamine, bis(N,N-dimethylaminoethyl)ether, and N,N,N',N'-tetramethyl-1,3-butanediamine. When a MDI-based polyisocyanate is used, a delayed action catalyst is preferred. Organoiron or organobismuth catalysts are useful delayed action catalysts, but any other catalyst which gives delayed action is useful. Suitable organoiron catalysts include the iron pentanediones. Suitable organobismuth catalyst include bismuth carboxylates. When MDI prepolymers are used, combinations of organoiron and organotin catalysts are preferred for their better cures. Organometallic catalysts are advantageously used in amounts ranging from about 0.001 to about 0.1, preferably about 0.005 to abut 0.05 parts per 100 parts by weight of polyol. Tertiary amine catalyst are advantageously used in amounts ranging for about 0.01 to about 5, preferably about 0.1 to about 2 parts per 100 parts by weight of polyol.

Suitable surfactants include the block copolymers of ethylene oxide, and silicone surfactants. Suitable silicone surfactants include those disclosed, for example, in U.S. Pat. No. 4,483,894, incorporated by reference. Such surfactants are advantageously employed in amounts ranging from about 0.01 to about 2 parts per 100 parts by weight of polyol.

Suitable filler materials include finely particulate materials such as calcium carbonate, aluminum trihydrate, titanium dioxide, iron oxide, barium sulfate and the like. The use of such fillers is preferred, as they improve certain physical properties and often impart improved flame resistance to the polyurethane. Such fillers are advantageously used in amount ranging from about 5 to about 300, preferably about 20 to about 500, more preferably about 70 to about 130 parts per 100 parts by weight of polyol. Chemically blown systems, and systems employing MDI or derivatives as the polyisocyanate, can have even higher filler loadings.

Other, optional ingredients of the polyurethane-forming composition include pigments, colorants, antistatic agents, reinforcing fibers, antioxidants, preservatives, water scavengers and the like.

In preparing polyurethane-backed textiles according to this invention, the individual components of the polyurethane-forming composition are mixed and applied as a layer of preferably uniform thickness onto one surface of the textile. It is often preferable to pre-mix all components except the polyisocyanate (and blowing agent, when a gas is used) to form a formulated "B-side". This simplifies the metering and mixing of components at the time the polyurethane-forming composition is prepared. In preparing a frothed polyurethane backing, it is preferred to mix all components and then blend a gas into the mixture, using equipment such as an Oakes or Firestone foamer.

The polyurethane-forming composition is then applied to one surface of a textile before it cures to a tack-free state. The composition may be applied to the textile before any significant curing takes place, using equipment such as a doctor knife, air knife or extruder to apply and gauge the layer. Alternatively, the composition may be formed into a layer on a moving belt or other suitable apparatus and partially cured, then married to the textile using equipment such as a double belt (double band) laminator or a moving belt with an applied foam cushion. After application and gauging, the layer is cured through the application of heat, such as by heating plates, a convection oven, an infrared oven, or other suitable apparatus. A cure temperature of about 100° to about 170° C., for a period of about 1 to about 60 minutes is suitable. Of course, the cure time is dependent on the temperature.

In one embodiment of the invention, the polyurethane-forming composition is applied to a textile which is already precoated with a certain polyurethane precoat layer. The use of this precoat layer is optional in this invention. The precoat layer is formed from a polyurethane precoat composition comprising, as reactive components, a polyether polyol, a chain extender and a polyisocyanate, as described in U.S. Pat. No. 4,296,159, incorporated by reference. Also useful are precoat formulations wherein the reactive components have an average functionality from about 1.95 to about 2.02, as is described, for example, in co-pending application Ser. No. 776,320, filed Sept. 16, 1985 (now U.S. Pat. No. 4,696,849). The use of the precoat layer provides much greater latitude in both the processing conditions and the composition of the polyurethane-forming composition. In particular, the use of the precoat layer permits the practitioner a greater latitude in selecting the components of the polyurethane-forming composition. The precoat allows one to employ slightly higher functionality components in the precoat composition. The use of such higher functionalities tends to be detrimental when no precoat layer is used, due to the tendency of the coated textile to distort. However, the use of precoat layer prevents the polyurethane-forming composition from penetrating into the fibers of the textile, which substantially reduces the distortion associated with using higher functionality components. The use of slightly higher functionality components provides the added advantage of forming a lower tack polyurethane layer and providing better physical properties.

The amount of the polyurethane-forming composition used can vary widely, from about 5 to about 500 ounces per square yard, depending on the characteristics of the textile. For making carpet tile, for example, relatively high amounts of the composition are used. Preferably, about 10 to about 200, more preferably about 30 to about 120 ounces of polyurethane-forming composition are used per square year of textile. When a precoat layer is used, it advantageously weighs about 3 to about 70, more preferably about 5 to about 40 ounces per square yard.

Once the polyurethane-forming composition is applied to the textile, it cured to a tack-free state. In order to further minimize distortion, it is preferred to handle the textile, at all times prior to final cure, such that mechanically induced stress is minimized. It is also preferred to cool the coated textile to a temperature of less than about 40° C. prior to rolling it up for storage or transportation, or cutting it into tiles or other shapes.

Methods for preparing polyurethane-backed textiles are disclosed, for example, in U.S. Pat. Nos. 4,515,646, 4,595,436, 4,512,831, 4,485,894, 4,405,393, 4,278,482, 4.171,3954,022,941, 3,895,149 3,862,879, 3,849,156, 3,821,130, and 3,821,067, all incorporated herein by reference.

In some applications, it is desirable to coat both sides of the textile with polyurethane, as in preparing carpet underlayment. This is easily done by coating the textile, then turning it over and coating the other side.

Multiple layers of polyurethane can, of course, be applied to the textile according to this invention. In addition, multiple layers of carpet or scrim materials can be employed. In particular, a non-woven scrim may be added to the textile as a bottom release layer to facilitate easy release from glue down installations.

The textile useful herein includes broadloom carpet, carpet tile, automotive carpet, fabrics for automotive trim, paneling and trunk liners, synthetic playing surfaces, woven or non-woven polymeric scrims, tennis ball covers, drapery fabrics, wall covering fabric and the like.

The polyurethane-backed textiles produced according to this invention are useful as attached cushion carpet, wall coverings, tennis balls, carpet underlayment, carpet tile, and the like.

The following examples are provided to illustrate the invention but are not intended to limit the scope thereof. All parts and percentages are by weight unless otherwise indicated.

EXAMPLE 1

Polyurethane forming composition Sample No. 1 and Comparative Sample A are used in this example to prepare polyurethane-backed carpet. The blowing agent is air in both cases. The make-up of these compositions is provided in Table 1.

TABLE 1

| | Parts by Weight | |
|---|---|---|
| Component | Sample No. 1 | Comp. Sample A* |
| Polyol Blend A[1] | 90 | 0 |
| Polyol B[2] | 0 | 90 |
| Diethylene glycol | 10 | 10 |
| Aluminum trihydrate | 40 | 40 |
| Calcium Carbonate | 40 | 40 |
| Organotin catalyst A[3] | 0.08 | 0.08 |
| Silicone surfactant | 0.125 | 0.125 |
| TDI prepolymer[4] | 38.9 | 40.3 |

[1]A 50/50 blend of a 2000 equivalent weight, 19% ethylene oxide-capped poly(propylene oxide) having a nominal functionality of 2 and an actual functionality of about 1.75 and a 2000 equivalent weight, 17% ethylene oxide-capped poly(propylene oxide) having a nominal functionality of 3 and an actual functionality of 2.26.
[2]A 1600 equivalent weight, 14% ethylene oxide capped poly(propylene oxide) having a nominal functionality of 3 and an actual functionality of 2.48.
[3]di(n-butyl)tinbis(isooctylmercaptacetate)
[4]A 26.8% -NCO prepolymer of TDI and a blend of a 200 molecular weight poly(ethylene oxide) diol and an adduct of glycerine and 3 moles of propylene oxide.

The components are blended and frothed with air in a Oakes foamer to a weight of 440-450 g/quart. The froth has a gel time of 3.1 minutes. The temperature of the froth is about 88° F. as it is obtained from the mixer. The pressure required to generate the froth is 110 psi for Sample No. 1 and 114 psi for Comparative Sample A. The frothed mixture is then applied to the reverse side of an 18.3 ounce space dyed level loop carpet having a nylon fabric tufted through a woven polypropylene primary, known commercially as Toronado, gauged to a coating weight as indicated in Table 2 following, and cured at 120° C. for 8 minutes. The physical properties are determined on a portion of the backing which has been delaminated from the carpet.

TABLE 2

| Properties | Sample No. 1 | Comp. Sample A* |
|---|---|---|
| Coating Weight, lb/yd$^2$ | 43 | 71 |
| Density, lb/ft$^3$ | 20 | 19 |
| Penetration Wt., lb/yd$^2$ | 8.5 | 16 |
| Thickness, mils | 193 | 234 |
| Compression set, 50%, % | 3.7 | 3.1 |
| Tensile Strength, psi | 116 | 94 |
| Elongation, % | 125 | 65 |
| Tear Strength, pli | 9.0 | 6.0 |
| Bend Splits, min | 3+ | 3+ |
| Resiliency, % | 44 | 43 |
| 25% ILD | 24 | 29 |
| Cell count**, /mm$^2$ | 77 | 63 |

*Not an example of this invention.
**Determined from a foam sample doctored onto a flat plate.

As can be seen from the data in Table 2, the backing made according to this invention has significantly better tensile, elongation and tear properties than the control, while maintaining substantially equivalent properties in other respects. The ILD value is somewhat reduced in Sample No. 1, as is expected in a less crosslinked polyurethane, but is still sufficient to provide a high quality product. The higher cell count obtained with this invention indicates that this composition froths more easily and uniformly than the control composition.

EXAMPLE 2

Polyurethane-forrming composition Sample No. 2 and Comparative Samples B and C are prepared from components as indicated in Table 3 following. The blowing agent in all cases is air.

TABLE 3

| | Parts by Weight | | |
|---|---|---|---|
| Component | Sample No. 2 | Comp. Samp. B* | Comp. Samp. C* |
| Polyol Blend A[1] | 90 | 0 | 0 |
| Polyol B[2] | 0 | 90 | 0 |
| Polyol C[3] | 0 | 0 | 90 |
| Diethylene glycol | 10 | 10 | 10 |
| Aluminum trihydrate | 40 | 40 | 40 |
| Calcium Carbonate | 40 | 40 | 40 |
| Organoiron Catalyst[4] | 1 | 1 | 1 |
| Organotin catalyst B[5] | 0.01 | 0.01 | 0 |
| Silicone surfactant | 0.125 | 0.125 | 0.125 |
| MDI blend[6] | 34.4 | 35.7 | 34.3 |

Not an example of this invention.
[1-2]See notes 1-2 in Table 1.
[3]A 2000 equivalent weight, 17% ethylene oxide capped poly(propylene oxide) with an actual functionality of 2.26.
[4]A 2% solution of iron acetylacetonate in a 2000 molecular weight poly(propylene oxide) diol.
[5]di(n-isooctyl)tin bis (isooctylmercaptylacetate)
[6]A 60/40 blend of a 143 equivalent weight "liquid MDI" and a polymeric MDI having an o,p'- content of 12% and an average functionality of 2.18.

The compositions are used to prepare a polyurethane-backed carpet according to the same procedure described in Example 1. A significant processing parameter change is in the pressure required to froth the compositions. With the use of the MDI blend, the required pressure is 85 psi for Sample No. 2, 80 psi for Comparative Sample B and 96 pounds for Comparative Sample C. The uses of MDI further permits the use of lower curing temperatures. The properties of the resulting backing are as indicated in Table 4 following.

TABLE 4

| Properties | Sample No. 2 | Comp. Samp. B* | Comp. Samp. C* |
|---|---|---|---|
| Coating Weight, lb/yd² | 66 | 65 | 55 |
| Density, lb/ft³ | 21.5 | 20 | 20 |
| Penetration Wt., lb/yd² | 13 | 15 | 12 |
| Thickness, mils | 205 | 213 | 180 |
| Compression set, 50%, % | 38.4 | 9.5 | 13.2 |
| Tensile Strength, psi | 99 | 84 | 95 |
| Elongation, % | 75 | 50 | 53 |
| Tear Strength, pli | 7.2 | 5.4 | 5.6 |
| Bend Splits, min | 3+ | 3+ | 3+ |
| Resiliency, % | 34 | 39 | 34 |
| 25% ILD | 30 | 33 | 30 |
| Cell count**, /mm² | 68 | 44 | N.D. |

*Not an example of this invention
**Determined from a foam sample doctored onto a flat plate.

As seen in Example 1, the process of this invention provides excellent tensile, elongation and tear properties, particularly as compared to those polyurethane-backed textiles made with the Comparative Samples. Using this process, a good quality MDI-based textile backed is obtained.

EXAMPLE 3

Sample No. 1 and Comparative Sample A from Example 1 are repeated, except this time the polyurethane-forming compositions are frothed to a weight of about 300 g/quart. The physical properties of these foams are as indicated (as Sample No. 3 and Comparative Sample D, respectively) in Table 5 following.

TABLE 5

| Properties | Sample No. 3 | Comp. Sample D* |
|---|---|---|
| Density, lb/ft³ | 15.5 | 14.6 |
| Thickness, mils | 213 | 225 |
| Compression set, 50%, % | 2.8 | 3.5 |
| Tensile Strength, psi | 57.8 | 54.5 |
| Elongation, % | 93.7 | 51.9 |
| Tear Strength, pli | 5.1 | 4.9 |
| Bend Splits, min | 3+ | 3/30 |
| Resiliency, % | 44 | 45 |
| 25% ILD | 15.8 | 19.3 |

*Not an example of this invention.

Improvement in tensile, elongation and tear are again seen.

EXAMPLE 4

Sample No. 2 and Comparative Samples A and B from Example 1 are repeated, except this time the polyurethane forming compositions are frothed to a weight of about 300 g/quart. The physical properties of these foams are as indicated (as Sample No. 4 and Comparative Samples E and F) in Table 6 following.

TABLE 6

| Properties | Sample No. 4 | Comp. Samp. E* | Comp. Samp. F* |
|---|---|---|---|
| Density, lb/ft³ | 15.9 | 15.3 | 14.9 |

TABLE 6-continued

| Properties | Sample No. 4 | Comp. Samp. E* | Comp. Samp. F* |
|---|---|---|---|
| Thickness, mils | 200 | 16.4 | 207 |
| Compression set, 50%, % | 39.5 | 11.4 | 9.0 |
| Tensile Strength, psi | 53.3 | 48 | 42 |
| Elongation, % | 80.4 | 50.7 | 43.5 |
| Tear Strength, pli | 4.1 | 3.8 | 3.5 |
| Bend Splits, min | 3+ | 3+ | 3+ |
| Resiliency, % | 32 | 32 | 32 |
| 25% ILD | 16.4 | 18.8 | 17.7 |

*Not an example of this invention.

Improvements in tensile, elongation and tear are again seen.

EXAMPLE 5

Following the procedure of Example 2, polyurethane-forming composition Sample Nos. 5-7 are prepared from components as indicated in Table 7 following. The blowing agent in all cases is air.

TABLE 7

| | Parts by Weight | | |
|---|---|---|---|
| Component | Sample No. 5 | Sample No. 6 | Sample No. 7 |
| Polyol Blend A[1] | 90 | 90 | 90 |
| Diethylene glycol | 10 | 10 | 10 |
| Aluminum trihydrate | 40 | 40 | 40 |
| Calcium Carbonate | 40 | 40 | 40 |
| Organoiron Catalyst[4] | 0 | 1 | 1 |
| Organotin catalyst A[5] | 0.01 | 0 | 0.01 |
| Organotin catalyst B[6] | 0 | 0.01 | 0 |
| Silicone surfactant | 0.125 | 0.125 | 0.125 |
| MDI blend[7] | 37.5 | 0 | 0 |
| MDI prepolymer A[8] | 0 | 40.6 | 0 |
| MDI prepolymer B[9] | 0 | 0 | 42.3 |

[1-2]See notes [1-2] in Table 1.
[3]A 2000 equivalent weight, 17% ethylene oxide capped poly(propylene oxide) with an actual functionality of 2.26.
[4]A 2% solution of iron acetylacetonate in a 2000 molecular weight poly(propylene oxide) diol.
[5]di(n-isooctyl)tin bis (isooctylmercaptylacetate)
[6]di(n-butyl)tin bis (isooctylmercaptylacetate)
[7]A 60/40 blend of a 143 equivalent weight "liquid MDI" and a polymeric MDI having an o,p'- content of 12% and an average functionality of about 2.18.
[8]A 52/48 mixture of an MDI prepolymer made by reacting 45 parts of a high o,p'-MDI with 7 parts tripropylene glycol and a 2.2 functional polymeric MDI having an o,p' content of 12%.
[9]A 60/40 by weight blend of a 181 equivalent weight MDI prepolymer and a polymeric MDI having an o,p'- content of 12% and an average functionality of about 2.18.

The resulting textile backings have properties as indicated in Table 8.

TABLE 8

| Properties | Sample No. 5 | Sample No. 6 | Sample No. 7 |
|---|---|---|---|
| Density, lb/ft³ | 20.6 | 20.0 | 21.9 |
| Compression set, 50%, % | 39.3 | 5.8 | 3.8 |
| Tensile Strength, psi | 55.3 | 49.3 | 63.7 |
| Elongation, % | 90.3 | 54.8 | 95.6 |
| Tear Strength, pli | 5.7 | 5.5 | 5.6 |
| Bend Splits, min | 3+ | 3+ | 3+ |
| 25% ILD, psi | 16.4 | 18.8 | 21.3 |

Both backings have excellent properties. Of particular note are the greatly reduced compression sets of Sample Nos. 6 and 7. This desirable property is attributable to the use of the MDI prepolymer. The use of the combination of organotin and organoiron catalysts in Sample Nos. 6 and 7 is further found to give improved cures when MDI prepolymers are used.

What is claimed is:

1. In a process for preparing a polyurethane-backed textile wherein an uncured polyurethane-forming composition is applied to a surface of the textile, gauged and cured to form an adherent backing thereto, the improvement comprising employing a frothed polyurethane-forming composition comprising
   (A) a polyol based on a $C_3$–$C_8$ alkylene oxide, which polyol has an equivalent weight of about 1000 to about 5000, and an internal poly(ethylene oxide) block or a terminal ethylene oxide cap constituting about 15 to about 30 percent of the weight of the polyol, or mixture of such polyols, wherein said polyol or mixture thereof has an average functionality of about 1.8 to about 2.2,
   (B) a minor amount of a low equivalent weight compound having about 2 active hydrogen containing groups per molecule, and
   (C) a polyisocyanate having an average functionality of about 1.9 to about 2.4, in an amount to provide the composition with about 0.9 to about 1.3 isocyanate groups per active hydrogen containing group, and
   (D) an effective amount of a blowing agent.

2. The process of claim 1 wherein component (A) comprises an ethylene oxide capped poly(propylene oxide) or mixture thereof.

3. The process of claim 2 wherein component (B) comprises an alkylene glycol or glycol ether.

4. The process of claim 3 wherein said polyurethane-forming composition further comprises a particulate, inorganic filler.

5. The process of claim 4 wherein component (A) comprises a mixture of a nominally trifunctional ethylene oxide-capped poly(polylene oxide) and a nominally difunctional ethylene oxide-capped poly(propylene oxide), said mixture having an average functionality of about 1.95 to about 2.05.

6. The process of claim 5 wherein said inorganic filler comprises aluminum trihydrate, calcium carbonate, barium sulfate or mixtures thereof.

7. The process of claim 5 wherein said polyisocyanate comprises toluene diisocyanate or a prepolymer thereof with glycerine or trimethylolpropane or mixture thereof with an alkylene glycol or glycol ether, said prepolymer having an average functionality of about 2.03 to about 2.2.

8. The process of claim 5 wherein said polyisocyanate comprises a mixture of a liquid MDI having an equivalent weight of about 130 to about 150 and a polymeric MDI, said mixture having an average functionality of about 2.03 to about 2.2.

9. The process of claim 5 wherein said textile is a carpet.

10. A process for preparing a polyurethane-backed textile, comprising the steps of
    (A) applying to a surface of a textile a layer of a polyurethane-forming composition comprising
       (1) a polyol based on a $C_3$–$C_8$ alkylene oxide, which polyol has an equivalent weight of about 1000 to about 5000, and an internal poly(ethylene oxide) block or a terminal ethylene oxide cap constituting about 15 to about 30 percent of the weight of the polyol, or mixture of such polyols, wherein said polyol or mixture thereof has an average functionality of about 1.8 to about 2.2,
       (2) a minor amount of a low equivalent weight compound having about 2 active hydrogen containing groups per molecule, and
       (3) a polyisocyanate having an average functionality of about 1.9 to about 2.4, in an amount to provide the composition with about 0.9 to about 1.25 isocyanate groups per active hydrogen containing group, and
       (4) an effective amount of a blowing agent, and
    (B) curing said polyurethane-forming composition to form a cellular polyurethane backing adherent to said textile.

* * * * *

UNITED STATES PATENT AND TRADEMARK OFFICE
CERTIFICATE OF CORRECTION

PATENT NO.  :  4,853,054

DATED       :  Aug. 1, 1989

INVENTOR(S) :  Robert B. Turner, et al.

It is certified that error appears in the above-identified patent and that said Letters Patent is hereby corrected as shown below:

Column 1, line 42, "is" should read -- has --.

Column 4, line 2, "1,4cyclohexyl" should read -- 1,4-cyclohexyl --.

Column 8, line 40, "Polyurethane-forrming" should read -- Polyurethane-forming --.

Column 9, line 5, "uses" should read -- use --.

Column 9, line 30, "backed" should read -- backing --.

Column 9, line 48(table 5), "3/30" should read -- 3+ --.

Column 11, line 37, "(polylene" should read -- (propylene --.

Signed and Sealed this

Fourteenth Day of July, 1992

Attest:

DOUGLAS B. COMER

*Attesting Officer*          *Acting Commissioner of Patents and Trademarks*

UNITED STATES PATENT AND TRADEMARK OFFICE
CERTIFICATE OF CORRECTION

PATENT NO. : 4,853,054

DATED : August 1, 1989

INVENTOR(S) : Robert B. Turner, Randall C. Jenkines, John F. Serratelli and Garland R. Barnes It is certified that error appears in the above-identified patent and that said Letters Patent is hereby corrected as shown below:

Column 3, line 33, "(o-cloroaniline)" should read --(o-chlorianiline--.
Column 5, line 17, "diethyltinediacetate," should read
--diethyltindiacetate,--.
Column 5, line 36, "abut" should read --about--.
Column 5, line 38, "for" should read --from--.
Column 6, line 65, "year" should read --yard--.
Column 7, line 12, "4.171,3954,022,941," should read --4,171,395, 4,022,941,--

Signed and Sealed this

Fourth Day of May, 1993

Attest:

MICHAEL K. KIRK

Attesting Officer

Acting Commissioner of Patents and Trademarks